(12) United States Patent
Brookshire et al.

(10) Patent No.: US 9,595,742 B2
(45) Date of Patent: Mar. 14, 2017

(54) SYSTEM AND METHOD FOR REPLACING A BATTERY IN AN UNINTERRUPTIBLE POWER SUPPLY

(75) Inventors: Kyle Brookshire, Belmont, MA (US); James S. Spitaels, Shrewsbury, MA (US); Vishwas Mohaniraj Deokar, Acton, MA (US); Fred William Rodenhiser, Wilmington, MA (US)

(73) Assignee: SCHNEIDER ELECTRIC IT CORPORATION, West Kingston, RI (US)

(*) Notice: Subject to any disclaimer, the term of this patent is extended or adjusted under 35 U.S.C. 154(b) by 554 days.

(21) Appl. No.: 12/412,681

(22) Filed: Mar. 27, 2009

(65) Prior Publication Data

US 2010/0244567 A1 Sep. 30, 2010

(51) Int. Cl.
*H02J 7/00* (2006.01)
*H01M 10/48* (2006.01)
*H02J 9/06* (2006.01)

(52) U.S. Cl.
CPC ............ *H01M 10/48* (2013.01); *H02J 9/062* (2013.01); *Y10T 307/625* (2015.04)

(58) Field of Classification Search
CPC .................................. H02J 9/00; Y04S 20/12
USPC ........................................................ 320/107
See application file for complete search history.

(56) References Cited

U.S. PATENT DOCUMENTS

| | | | |
|---|---|---|---|
| 4,217,645 A | 8/1980 | Barry et al. | |
| 4,394,741 A | 7/1983 | Lowndes | |
| 4,564,767 A | 1/1986 | Charych | |
| 4,692,632 A | 9/1987 | Gaul et al. | |
| 4,782,241 A | 11/1988 | Baker et al. | |
| 5,019,717 A | 5/1991 | McCurry et al. | |
| 5,126,585 A | 6/1992 | Boys | |
| 5,170,124 A | 12/1992 | Blair et al. | |
| 5,184,025 A | 2/1993 | McCurry et al. | |
| 5,291,383 A | 3/1994 | Oughton | |
| 5,295,078 A * | 3/1994 | Stich et al. | 700/297 |
| 5,315,533 A | 5/1994 | Stich et al. | |
| 5,319,571 A | 6/1994 | Langer et al. | |

(Continued)

*Primary Examiner* — Richard Isla Rodas
*Assistant Examiner* — Johali Torres Ruiz
(74) *Attorney, Agent, or Firm* — Lando & Anastasi, LLP

(57) ABSTRACT

A system for guiding a user through a procedure corresponding to installing a battery in a UPS that is associated with the system. The system includes at least one programmed processor embedded within the UPS. The programmed processor is configured to retrieve at least one stored procedure corresponding to installing the battery in the UPS including at least one step to be performed by the user. The system further includes at least one device embedded within the UPS to provide information regarding a status indicator of the battery of the UPS. The programmed processor and the device are operatively coupled such that the programmed processor receives at least a portion of the information of the battery from the device. The system further includes a user interface forming part of the UPS. The user interface is coupled to the programmed processor for displaying the step of the stored procedure. The programmed processor is configured to prompt the user via the user interface to install a battery and reset at least one battery performance indicator. Other systems, devices and methods for replacing a battery within a device are further disclosed.

20 Claims, 14 Drawing Sheets

(56) References Cited

U.S. PATENT DOCUMENTS

| | | |
|---|---|---|
| 5,321,626 A | 6/1994 | Palladino |
| 5,321,627 A | 6/1994 | Reher |
| 5,325,041 A | 6/1994 | Briggs |
| 5,381,554 A | 1/1995 | Langer et al. |
| 5,455,499 A | 10/1995 | Uskali et al. |
| 5,458,991 A | 10/1995 | Severinsky |
| 5,579,197 A | 11/1996 | Mengelt et al. |
| 5,602,462 A | 2/1997 | Stich et al. |
| 5,664,202 A | 9/1997 | Chen et al. |
| 5,666,040 A | 9/1997 | Bourbeau |
| 5,744,932 A * | 4/1998 | Kissel ............... G01R 31/3648 320/106 |
| 5,793,627 A | 8/1998 | Caldes et al. |
| 5,886,890 A | 3/1999 | Ishida et al. |
| 5,923,099 A | 7/1999 | Bilir |
| 5,995,400 A * | 11/1999 | Park ...................... H02J 9/00 307/64 |
| 6,031,354 A | 2/2000 | Wiley et al. |
| 6,170,007 B1 | 1/2001 | Venkatraman et al. |
| 6,175,511 B1 | 1/2001 | Ooba |
| 6,184,593 B1 | 2/2001 | Jungreis |
| 6,201,319 B1 | 3/2001 | Simonelli et al. |
| 6,201,371 B1 | 3/2001 | Kawabe et al. |
| 6,204,574 B1 | 3/2001 | Chi |
| 6,268,711 B1 | 7/2001 | Bearfield |
| 6,274,950 B1 | 8/2001 | Gottlieb et al. |
| 6,285,178 B1 | 9/2001 | Ball et al. |
| 6,301,674 B1 | 10/2001 | Saito et al. |
| 6,329,792 B1 | 12/2001 | Dunn et al. |
| 6,433,444 B1 | 8/2002 | de Vries |
| 6,465,910 B2 | 10/2002 | Young et al. |
| 6,469,471 B1 | 10/2002 | Anbuky et al. |
| 6,493,243 B1 | 12/2002 | Real |
| 6,549,014 B1 | 4/2003 | Kutkut et al. |
| 6,584,329 B1 | 6/2003 | Wendelrup et al. |
| 6,700,351 B2 | 3/2004 | Blair et al. |
| 6,784,641 B2 | 8/2004 | Sakai et al. |
| 6,795,322 B2 | 9/2004 | Aihara et al. |
| 6,854,065 B2 | 2/2005 | Smith et al. |
| 6,894,622 B2 | 5/2005 | Germagian et al. |
| 6,922,347 B2 | 7/2005 | Lanni |
| 6,923,676 B2 | 8/2005 | Perry |
| 6,983,212 B2 | 1/2006 | Burns |
| 7,015,599 B2 | 3/2006 | Gull et al. |
| 7,050,312 B2 | 5/2006 | Tracy et al. |
| 7,057,308 B2 | 6/2006 | Stranberg et al. |
| 7,082,541 B2 | 7/2006 | Hammond et al. |
| 7,132,833 B2 | 11/2006 | Layden et al. |
| 7,141,891 B2 | 11/2006 | McNally et al. |
| 7,142,950 B2 | 11/2006 | Rasmussen et al. |
| 7,202,576 B1 | 4/2007 | Dechene et al. |
| 7,242,111 B2 | 7/2007 | Menas et al. |
| 7,259,477 B2 | 8/2007 | Klikic et al. |
| 7,274,112 B2 | 9/2007 | Hjort et al. |
| 7,301,249 B2 | 11/2007 | Stranberg et al. |
| 7,352,083 B2 | 4/2008 | Nielsen et al. |
| 7,402,921 B2 | 7/2008 | Ingemi et al. |
| 7,432,615 B2 | 10/2008 | Hjort |
| 7,446,433 B2 | 11/2008 | Masciarelli et al. |
| 7,456,518 B2 | 11/2008 | Hjort et al. |
| 7,521,823 B2 | 4/2009 | Klikic et al. |
| 7,608,944 B2 | 10/2009 | Stranberg et al. |
| 7,615,890 B2 | 11/2009 | Masciarelli et al. |
| 7,615,891 B2 | 11/2009 | Wu et al. |
| 2001/0005894 A1 | 6/2001 | Fukui |
| 2001/0033502 A1 | 10/2001 | Blair et al. |
| 2001/0034735 A1 | 10/2001 | Sugiyama |
| 2002/0130556 A1 | 9/2002 | Hohri |
| 2002/0136042 A1 | 9/2002 | Layden et al. |
| 2002/0136939 A1 | 9/2002 | Grieve et al. |
| 2002/0138785 A1 | 9/2002 | Hammond et al. |
| 2003/0033550 A1 | 2/2003 | Kuiawa et al. |
| 2003/0048006 A1 | 3/2003 | Shelter, Jr. et al. |
| 2003/0062775 A1 | 4/2003 | Sinha |
| 2003/0076696 A1 | 4/2003 | Tsai |
| 2003/0114963 A1 | 6/2003 | Walker |
| 2003/0132949 A1* | 7/2003 | Fallon ..................... G06F 1/28 715/700 |
| 2004/0036361 A1 | 2/2004 | Dai et al. |
| 2004/0104706 A1 | 6/2004 | Ooi et al. |
| 2005/0029984 A1* | 2/2005 | Cheng et al. ............... 320/107 |
| 2005/0071093 A1 | 3/2005 | Stefan |
| 2005/0071699 A1 | 3/2005 | Hammond et al. |
| 2005/0162129 A1 | 7/2005 | Mutabdzija et al. |
| 2005/0201127 A1 | 9/2005 | Tracy et al. |
| 2005/0206241 A1* | 9/2005 | Saxena ..................... H02J 9/06 307/66 |
| 2005/0227519 A1 | 10/2005 | Perry |
| 2006/0192436 A1 | 8/2006 | Stranberg et al. |
| 2006/0238941 A1 | 10/2006 | Ingemi et al. |
| 2007/0055409 A1 | 3/2007 | Rasmussen et al. |
| 2007/0064363 A1 | 3/2007 | Nielsen et al. |
| 2007/0216229 A1 | 9/2007 | Johnson, Jr. et al. |
| 2008/0042491 A1 | 2/2008 | Klikic et al. |
| 2008/0157602 A1 | 7/2008 | Stranberg et al. |
| 2009/0160254 A1 | 6/2009 | Wu et al. |
| 2009/0201703 A1 | 8/2009 | Klikic et al. |
| 2009/0231892 A1 | 9/2009 | Klikic et al. |
| 2009/0251002 A1 | 10/2009 | Cohen et al. |
| 2010/0049457 A1 | 2/2010 | Mutabdzija et al. |
| 2010/0201194 A1 | 8/2010 | Masciarelli et al. |

* cited by examiner

SYSTEM AND METHOD FOR REPLACING A BATTERY IN AN UNINTERRUPTIBLE POWER SUPPLY

BACKGROUND OF THE DISCLOSURE

Field of the Disclosure

At least one embodiment in accordance with the present disclosure relates generally to systems and methods for providing uninterruptible power and more specifically to control systems and methods used in an uninterruptible power supply (UPS) to monitor the function and life expectancy of one or more batteries provided in a UPS, and to guide an operator in replacing a battery.

Discussion of Related Art

The use of uninterruptible power supplies to provide regulated, uninterrupted power for sensitive and/or critical loads, such as computer systems and other data processing systems, is known. A number of different UPS products are available including those identified under the trade name Smart-UPS® from American Power Conversion Corporation of West Kingston, R.I. In a typical UPS, a battery is used to provide backup power for a critical load during blackout or brownout conditions. A user of a typical UPS is able to configure and control the UPS either through a computer coupled to the UPS or using through a user interface of the UPS itself.

SUMMARY OF THE DISCLOSURE

One aspect of the present disclosure is directed to a system for guiding a user through a procedure corresponding to installing a battery in a UPS that is associated with the system. In one embodiment, the system comprises at least one programmed processor embedded within the UPS. The programmed processor is configured to retrieve at least one stored procedure corresponding to installing the battery in the UPS including at least one step to be performed by the user. The system further comprises at least one device embedded within the UPS. The device provides information regarding a status indicator of the battery of the UPS. The programmed processor and the device are operatively coupled such that the programmed processor receives at least a portion of the information of the battery from the device. The system further comprises a user interface forming part of the UPS. The user interface is coupled to the programmed processor for displaying the step of the stored procedure. The programmed processor is configured to prompt the user via the user interface to install a battery and reset at least one battery performance indicator.

Embodiments of the system may further include providing the step of resetting the battery performance indicator includes verifying battery runtime accuracy. In certain embodiments, the step of resetting the battery performance indicator includes calibrating battery constant values and/or updating the battery installation date. The programmed processor is further configured to notify the user via the user interface of when the battery will shut down. The programmed processor, when prompting the user to install the battery, notifies the user of a battery disconnection. The programmed processor, when prompting the user to install the battery, notifies the user of proper installation of the battery. The programmed processor, when prompting the user to reset the battery performance indicator, prompts the user to input or otherwise verify the installation date of the battery.

Another aspect of the present disclosure is directed to a system for guiding a user through a procedure corresponding to installing a battery in a power device that is associated with the system. In one embodiment, the system comprises at least one programmed processor embedded within the device. The programmed processor is configured to retrieve at least one stored procedure corresponding to installing the battery in the device including at least one step to be performed by the user. The system further comprises at least one device embedded within the device. The device provides information regarding a status indicator of the battery of the device. The programmed processor and the device are operatively coupled such that the programmed processor receives at least a portion of the information of the battery from the device. The system further comprises a user interface forming part of the device. The user interface is coupled to the programmed processor for displaying the step of the stored procedure. The programmed processor is configured to prompt the user via the user interface to install a battery and reset at least one battery performance indicator.

Yet another aspect of present disclosure is directed to a UPS comprising a housing, an input, supported by the housing, to receive input power, a power supply circuit, supported by the housing and coupled to the input, to convert input power received from the input, an output, supported by the housing and coupled to the power supply circuit, to provide output power derived from the power supply circuit, a battery, supported by the housing and coupled to the power supply circuit, to provide battery power to the power supply circuit when input power to the input is compromised, and a controller, supported by the housing and coupled to the power supply circuit. The controller is configured to retrieve at least one stored procedure corresponding to installing the battery including at least one step to be performed by the user. The UPS further comprises at least one device, supported by the housing, to provide information regarding the status of the battery of the UPS. The controller and the device are coupled such that the controller receives at least a portion of the information from the device. The UPS further comprises a user interface, supported by the housing and coupled to the controller, to display the step. The controller is further configured to prompt the user via the user interface to install the battery.

Embodiments of the UPS may further include configuring the controller to reset at least one battery performance indicator. The step of resetting the battery performance indicator includes calibrating battery constant values and/or updating the battery installation date. The controller prompts the user to input or otherwise confirm the installation date of the battery. The controller is further configured to notify the user via the user interface of when the battery will shut down. The controller, when prompting the user to install the battery, notifies the user of a battery disconnection. The controller, when prompting the user to install the battery, prompts the user to input or otherwise confirm the installation date of the battery.

Another aspect of the present disclosure is directed to a method of guiding a user through a procedure corresponding to installing a battery of a UPS. In one embodiment, the method comprises: (a) determining whether the battery within the UPS is connected to the UPS; (b) initiating a battery installment routine if the battery within the UPS requires installment; and (c) displaying steps (a) and (b) on a user interface provided on a housing of the UPS.

Embodiments of the method may further include initiating the battery installment routine to install a new battery. Initiating the battery installment routine further includes determining whether the battery has been properly installed. Determining whether the battery has been properly installed is determined by obtaining information of the status of the battery of the UPS from at least one device embedded within the UPS. Initiating the battery installment routine further includes resetting at least one battery performance indicator. Resetting the battery performance indicator includes verifying battery runtime accuracy, calibrating battery constant values and/or updating the battery installation date.

A further aspect of the present disclosure is directed to a method of guiding a user through a procedure corresponding to installing a battery of a power device. In one embodiment, the method comprises: (a) determining whether the battery within the device is connected to the UPS; (b) initiating a battery installment routine if the battery within the device requires installment; and (c) displaying steps (a) and (b) on a user interface provided on a housing of the device.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION OF THE DISCLOSURE

Figure 1:
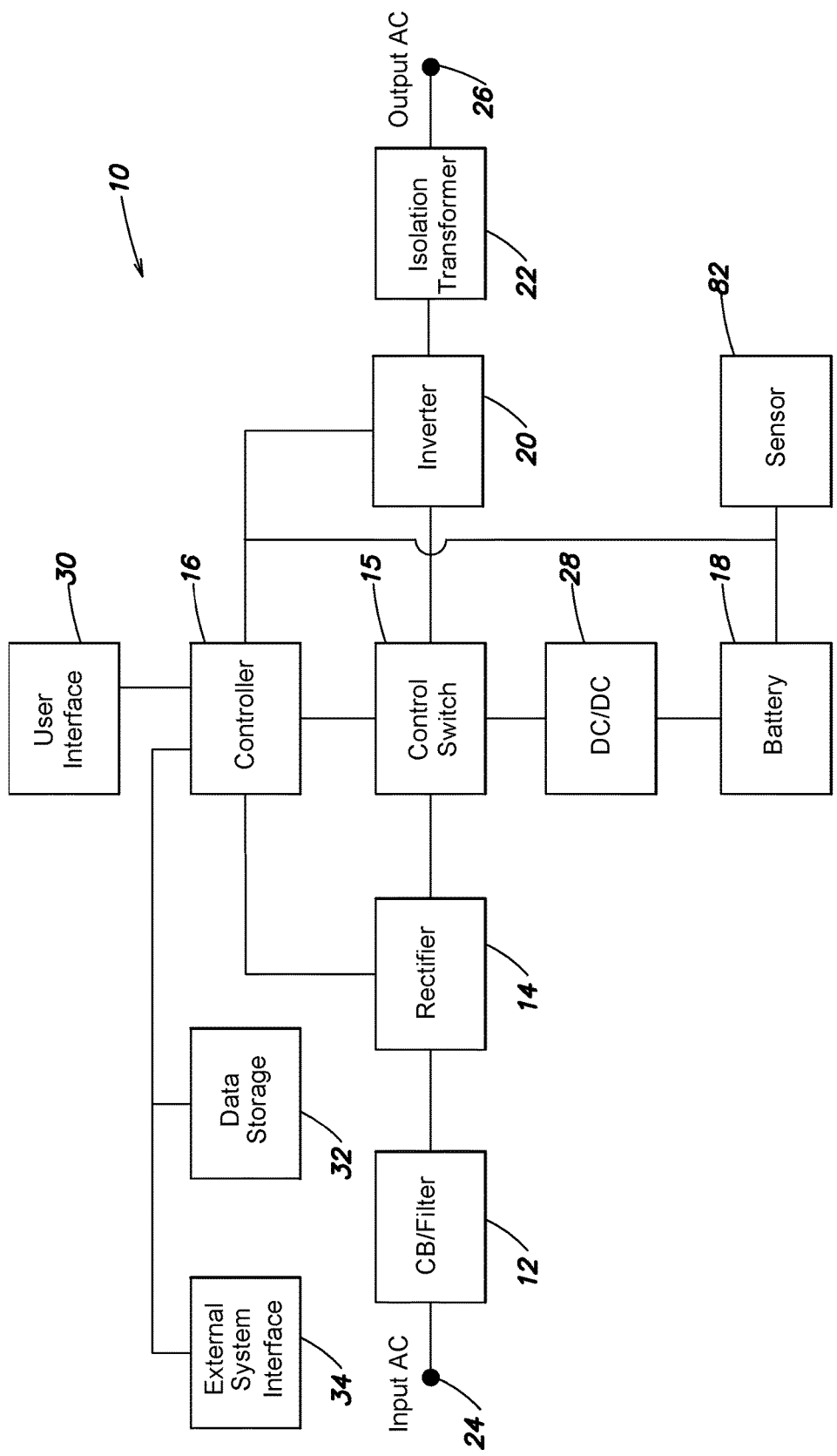
FIG. 1 is a schematic block diagram of a UPS of an embodiment of the disclosure.

At least some embodiments in accordance with the present disclosure relate to systems and processes for providing improved control, monitoring and/or configuration of uninterruptible power supplies.

The aspects disclosed herein in accordance with the present disclosure, are not limited in their application to the details of construction and the arrangement of components set forth in the following description or illustrated in the drawings. These aspects are capable of assuming other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments.

FIG. 1 shows an on-line UPS 10 used to provide regulated, uninterrupted power in accordance with one embodiment of the disclosure. The UPS 10 includes an input circuit breaker/filter 12, a rectifier 14, a control switch 15, a controller 16, a battery 18, an inverter 20, an isolation transformer 22, a DC/DC converter 28, a user interface 30, data storage 32 and external system interface 34. The UPS also includes an input 24 for coupling to an AC power source, and an outlet 26 for coupling to a load.

The UPS 10 operates as follows. The circuit breaker/filter 12 receives input AC power from the AC power source through the input 24, filters the input AC power and provides filtered AC power to the rectifier 14. The rectifier 14 rectifies the input voltage. The DC/DC converter 28 regulates DC power from the battery 18. The control switch 15 receives the rectified power and also receives the DC power from the DC/DC converter 28. The controller 16 determines whether the power available from the rectifier 14 is within predetermined tolerances, and if so, controls the control switch 15 to provide the power from the rectifier 14 to the inverter 20. If the power from the rectifier 14 is not within the predetermined tolerances, which may occur because of "brown out" or "black out" conditions, or due to power surges, then the controller 16 controls the control switch 15 to provide the DC power from the battery 18 via DC/DC converter 28 to the inverter 20.

In the shown embodiment, the controller 16 is coupled to the rectifier 14, the control switch 15 and the inverter 20. The controller 16 is configured to receive information from the rectifier 14 when a "brown out" or "black out" condition occurs. Such a condition may occur when power to the input 24 is terminated. In other embodiments, the controller may be coupled the other components of the UPS 10 including the input 24, the breaker/filter 12, the isolation transformer 22, the DC/DC converter 28 and/or the battery 18.

In an alternative example, the battery is coupled to the rectifier circuit and the rectifier functions as a boost converter on-line mode of operation and on-battery mode of operation as described in U.S. Pat. No. 7,402,921, entitled "Method and Apparatus For Providing Uninterruptible Power," issued Jul. 22, 2008, which is hereby incorporated herein by reference in its entirety.

The inverter 20 of the UPS 10 receives DC power and converts the DC power to AC power and regulates the AC power to predetermined specifications. The inverter 20 provides the regulated AC power to the isolation transformer 22. The isolation transformer 22 is used to increase or decrease the voltage of the AC power from the inverter 20 and to provide isolation between a load and the UPS 10. The isolation transformer 22 is an optional device, the use of which is dependent on UPS output power specifications. Depending on the capacity of the battery 18 and the power requirements of the load, the UPS 10 can provide power to the load during brief power source dropouts or for extended power outages or when power to the UPS is otherwise compromised.

Using data stored in associated memory, the controller 16 performs one or more instructions or procedures that may result in manipulated data, and the controller monitors and controls operation of the UPS 10. In some examples, the controller 16 may include one or more processors or other types of controllers. In one example, the controller 16 is a commercially available, general purpose processor. In another example, the controller 16 performs a portion of the functions disclosed herein on a general purpose processor and performs another portion using an application-specific integrated circuit (ASIC) tailored to perform particular operations. As illustrated by these examples, embodiments in accordance with the present disclosure may perform the operations described herein using many specific combinations of hardware and software and the disclosure is not limited to any particular combination of hardware and software components.

The data storage 32 stores computer readable information required for the operation of the UPS 10. This information may include, among other information, data subject to manipulation by the controller 16 and instructions that are executable by the controller 16 to manipulate data. Thus, in some embodiments, the data storage 32 can receive and store or retrieve and provide this computer readable information. The data storage 32 may include relatively high performance, volatile, random access memory such as a dynamic random access memory (DRAM) or static memory (SRAM) or may include a nonvolatile storage medium such as read-only memory (ROM), magnetic disk, flash memory, CD, DVD or one or more electrical switches, such as a dip switch. In one example, the data storage 32 includes both volatile and non-volatile storage. Various examples in accordance with the present invention can organize the data storage 32 into particularized and, in some cases, unique structures to perform the aspects and functions disclosed herein. In addition, these data structures may be specifically configured to conserve storage space or increase data exchange performance.

The external system interface 34 exchanges data with one or more external devices. These external devices may include any device configured to communicate using standards and protocols supported by the UPS 10. Examples of specific standards and protocols that the external system interface 34 may support include parallel, serial, and USB interfaces. Other examples of these supported protocols and standards include networking technologies such as UDP, TCP/IP and Ethernet technologies.

Figure 2:
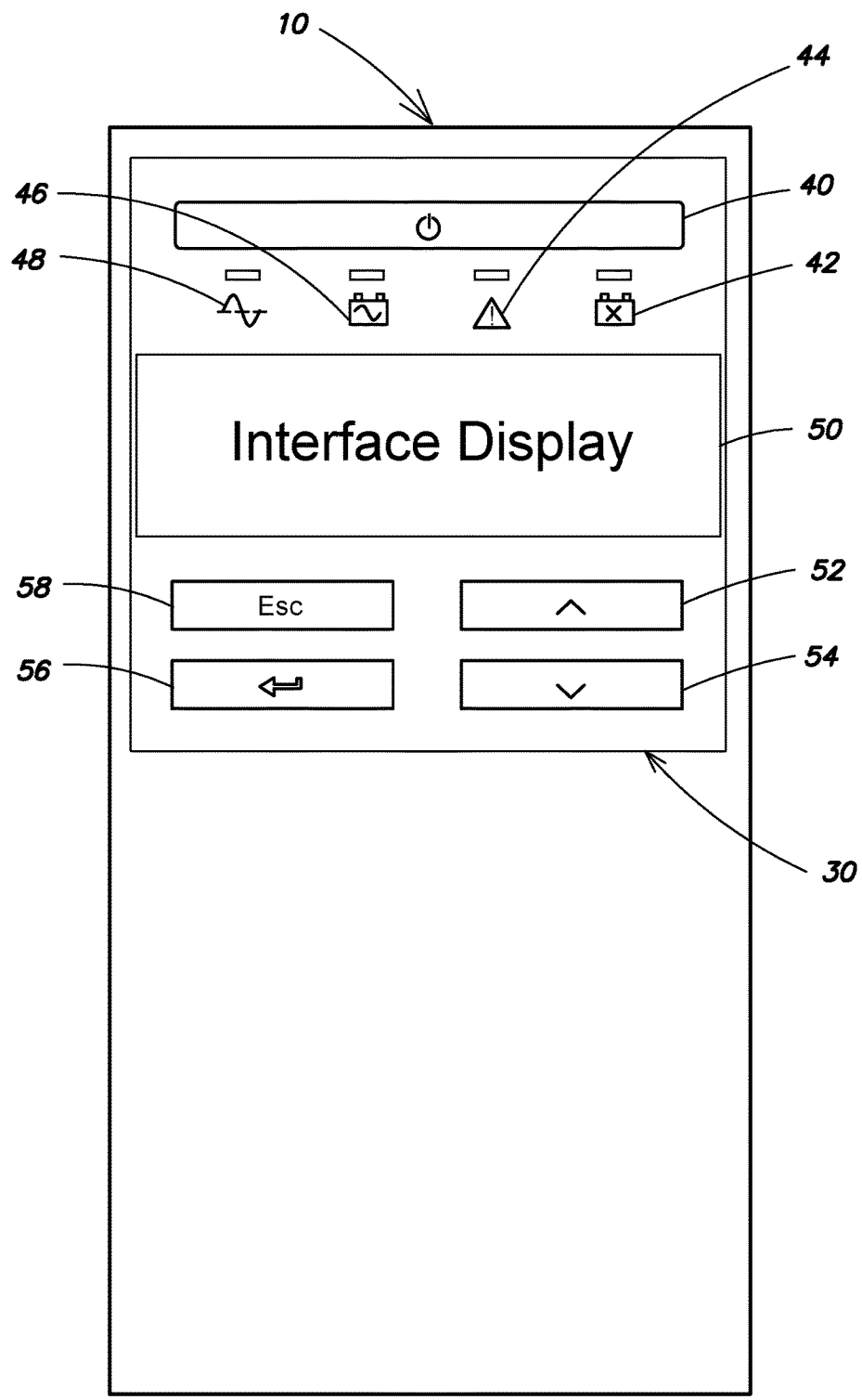
FIG. 2 is a view showing a user interface of the UPS.

Referring to FIG. 2, the exemplary user interface 30 includes a display screen and a set of keys through which a user of the UPS 10 can monitor, control and configure operation of the UPS 10. FIG. 2 depicts an external view of the UPS 10 including the user interface 30. The user interface 30 includes a power button 40, a replace battery indicator 42, a warning indicator 44, an on-battery power indicator 46, an on-line power indicator 48, an interface display 50, a scroll up button 52, a scroll down button 54, an enter button 56 and an escape button 58. The user interface 30 may embody any type of display or display screen known in the art.

The user interface 30 functions as follows. The power button 40, when actuated, will cause the UPS 10 to toggle between power-on and power-off states. According to some embodiments, the UPS 10 performs a series of accompanying actions to better manage these power state transitions.

The set of indicators 42, 44, 46 and 48 provide various information regarding current and prior states of the UPS 10. For example, the UPS 10 may determine by running a self-test that the battery 18 needs to be replaced. In this instance, the UPS 10 illuminates the replace battery indicator 42 to communicate this need.

The on-line power indicator 48 and the on-battery power indicator 46 signal the current source of power to the load. An active on-line power indicator 48 signals that the UPS 10 is providing power to the load in a normal operating fashion, i.e., the source of the power is the AC received through input 24. Conversely, the active on-battery power indicator 46 signals that the source of the power to the load is battery 18.

In another example, the UPS 10 may determine, for a variety of reasons, that the attention of an operator is needed. The reasons may include, among others, detection that the battery 18 is disconnected or that the battery 18 has been depleted by the load. In this case, the UPS 10 signals the need for operator attention by activating the warning indicator 44. In addition, the UPS 10 may provide a description of the reason for the warning in the interface display 50.

The interface display 50, which can be fashioned by a variety of hardware components including Liquid Crystal Displays and Light Emitting Diodes, presents a wide variety of information to a user. In one example, the interface display 50 is an alphanumeric display that can display numerical and textual information. This information may include monitoring information, such as the status warnings discussed above. In addition, this information may include configuration information and prompts through which the UPS 10 collects information from the user. Together, the interface display 50 and buttons 52, 54, 56 and 58 provide the UPS 10 with more flexibility in exchanging information with the user than is available using conventional UPS technology.

In one example, UPS 10 includes an interface structure that can be navigated by the user using the display interface 50 and buttons 52, 54, 56 and 58. This interface structure may include a variety of elements related to one another in various ways. For example, the interface structure may be a hierarchical menu structure. The behavior initiated by actuation of the buttons 52, 54, 56 and 58 is dependent upon the current location of the user in the interface structure, as is the information displayed in the display interface 50.

For example, the current location of the user may be an intermediate location within the interface structure, i.e. the current location connects to other elements of the interface structure. In this situation, the display interface 50 displays one of a list of the other elements of the interface structure connected to the user's current location and the buttons 52, 54, 56 and 58 are configured to provide navigational functions. In this mode, the user can move through, and cause the display interface 50 to display each element of, the list of the elements of the interface structure that are connected to the current location by using buttons 52 and 54. More precisely, the user can move up the list by actuating the scroll up button 52 and down the list by actuating the scroll down button 54. Furthermore, the user can navigate to the element of the interface structure currently displayed in interface 50 by actuating the enter button 56. Conversely, the user can navigate to the user's previous location in the interface structure by actuating the escape button 58.

In another example, the current location of the user in the interface structure may cause the UPS 10 to display review information to the user via the display interface 50. This review information may be any information stored within the UPS 10 and may include, among other information, configuration information, operational information and information regarding other devices in communication with the UPS 10, such as devices to which the UPS 10 supplies power. In one example, the display interface 50 displays an element belonging to a list of review information and the buttons 52, 54, 56 and 58 are configured to provide review functions. Under this configuration, the user can move through, and cause the display interface 50 to display each element of the list of review information. More specifically, and much like the navigational mode discussed above, the user can navigate up or down the list of review information by actuating the scroll up button 52 or the scroll down button 54. Furthermore, the user can navigate to the user's previous location in the interface structure by actuating the escape button 58. In at least some embodiments, actuation of the enter button 56, while in this mode, results in an error message explaining that the other keys are the valid keys at the user's current location within the interface structure.

According to another example, the current location of the user in the interface structure may cause the UPS 10 to prompt the user for information through the display interface 50. The information prompted for may be any information stored within the UPS 10 and may include, among other information, configuration information, information regarding the source of power into the UPS 10 and information regarding other devices in communication with the UPS 10, such as devices to which the UPS 10 supplies power. In this instance, the display interface 50 displays a prompt for information and the buttons 52, 54, 56 and 58 are configured to provide data entry functions. In this situation, the user can adjust the information displayed in the display interface 50 and enter answers to the prompts. More specifically, the user can change the answer to the prompt using the scroll up button 52 or the scroll down button 54. For example, a user can toggle a Boolean value from true to false or from yes to no, by actuating either of buttons 52 or 54. In another example, the user can increase or decrease a numerical answer displayed in the prompt by actuating the scroll up button 52 or the scroll down button 54. In still another example, the user can scroll up or down a list of answers using the scroll up button 52 or the scroll down button 54. In addition, the user can enter the currently displayed answer for the prompt by actuating the enter button 56. The user can also exit the prompt without saving the currently displayed answer by actuating the escape key 58. Thus, the particular arrangement and function of the user interface 30 provides users with sundry advantages over conventional UPS interfaces.

The user interface shown in FIG. 2 may be implemented in other embodiments using different configurations of buttons, different styles of buttons and using display screens of different sizes.

While embodiments of the disclosure have been described herein for use with a line interactive UPS, other embodiments may be used with other UPS topologies including on-line and off-line UPSs. Further, at least some embodiments described herein may be used with power supplies other than UPSs and in other electronics systems.

Figure 4:
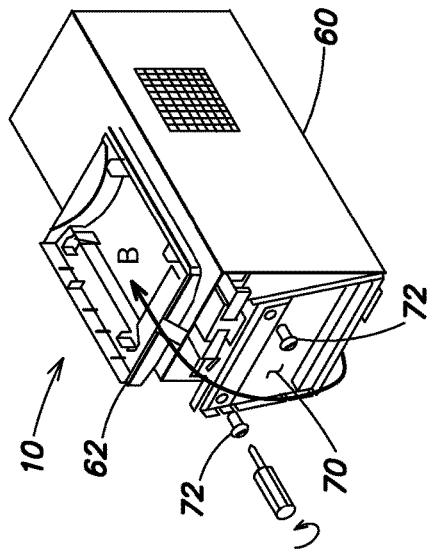
FIGS. 3 and 4 are perspective views of the UPS showing the removal of a front cover of the UPS.
Figure 5:
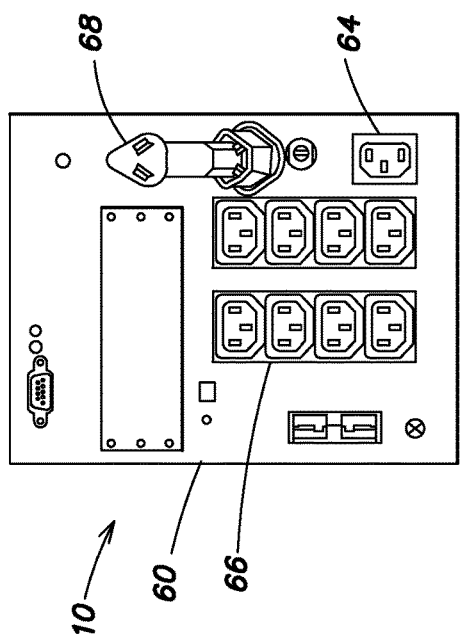
FIG. 5 is a back view of the UPS shown in FIGS. 3 and 4.
Figure 3:
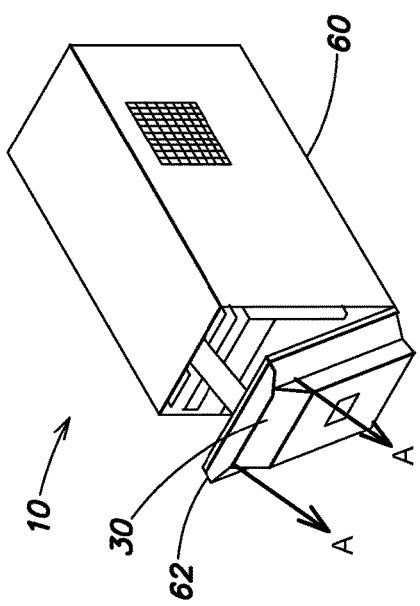
Figure 7:
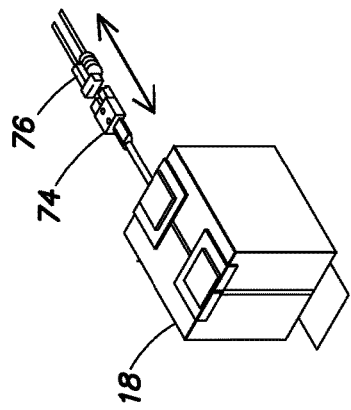
FIGS. 6 and 7 are perspective views showing the removal of a battery of one embodiment of the disclosure.
Figure 9:
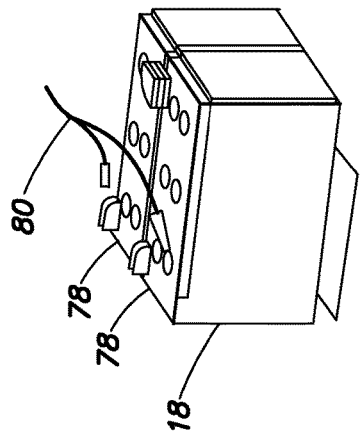
FIGS. 8 and 9 are perspective views showing the removal of a battery of another embodiment of the disclosure.
Figure 6:
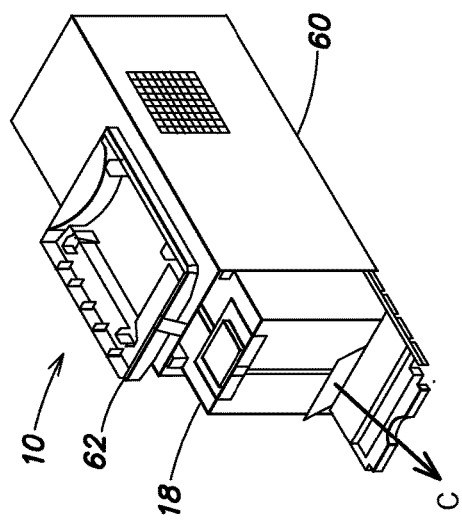
Figure 8:
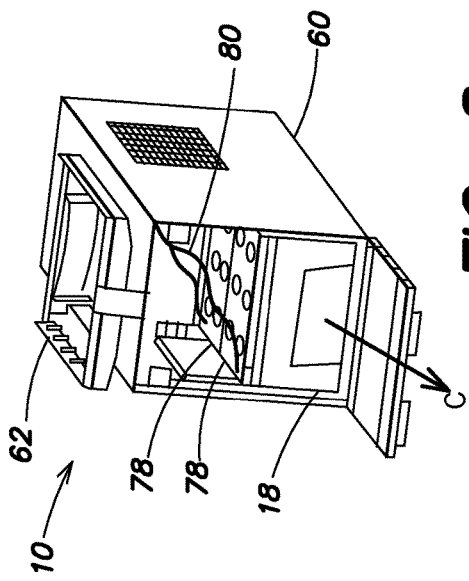
Figure 10:
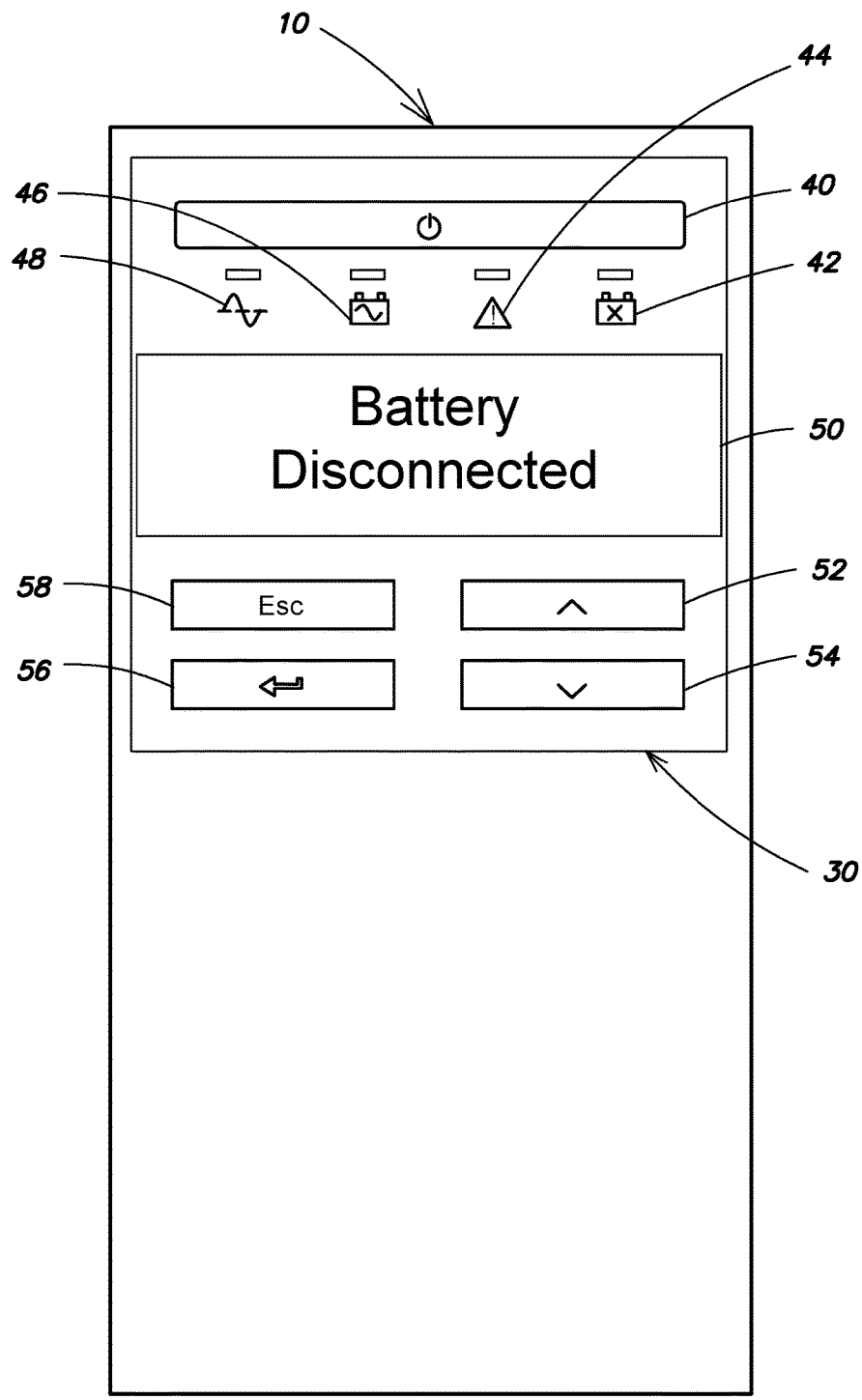
FIGS. 10-19 are views of the user interface showing a variety of commands to the user.

Turning now to FIGS. 3-9, and more particularly to FIGS. 3 and 4, an example of UPS 10 may embody the aforementioned Smart-UPS®, which is manufactured and sold by American Power Conversion Corporation of West Kingston, R.I., the assignee of the present disclosure. Illustrated in FIGS. 6 and 7 is model no. 1500VA. Illustrated in FIGS. 8 and 9 is model no. 1000VA. Although two different models are illustrated in FIGS. 6 and 7 and in FIGS. 8 and 9, respectively, the same reference numbers are used to designate common parts between the two models.

As shown in FIGS. 3 and 4, the UPS 10 includes a housing 60 and a front cover 62 removably connected to the housing. In one embodiment, the front cover 62 may be hingedly connected to the housing 60 by moving the cover in the manner indicated by arrows A (FIG. 3). Removal of the cover 62 is depicted by arrow B (FIG. 4). The interior of the housing 60 may be accessed when removing the cover 62. The interior of the housing contains the working components of the UPS 10 including components forming part of a primary "power supply circuit," which may include the breaker/filter 12, the rectifier 14, the control switch 15, and the isolation inverter 20. The controller 16, the battery 18, the isolation transformer, and related components may also form part of the power supply circuit.

Referring to FIG. 5, with reference to FIG. 1, the input 24 may be provided at the back of the housing 60 in the form of a receptacle 64 designed to accept power through a power cord (not shown). The input 24 is coupled to the power supply circuit, e.g., the breaker/filter 12, the rectifier 14, the control switch 15, the inverter 20 and the isolation transformer 22, which is contained within the housing 60. The output 26 may be provided at the back of the housing as well in the form of one or more receptacles collectively designated at 66 designed to receive power cords connected to equipment (not shown). A battery connector 68, which may be connected to other batteries (not shown) external to the UPS 10, may also be provided at the back of the housing 60.

To facilitate the removal and installation of batteries, a battery cover 70 is hingedly connected to the housing 60 and may be opened by removing a pair of screw fasteners, each indicated at 72, in the manner illustrated in FIG. 4. Once the fasteners 72 are removed, the battery cover 70 may be moved so that it lies along the same plane as a bottom wall of the housing 60. In one embodiment illustrated in FIGS. 6 and 7, the battery 18 may be removed from the housing 60 in the manner indicated by arrow C. After removing the battery 18 from the housing 60 in a position that the battery is pulled out of the housing until a back of the battery is flush with outer edges of the housing, the battery may be disconnected. A cable connector 74 of the battery 18 is disconnected from a cable connector 76 of the UPS 10. The cable connector 74 of the battery 18 and the cable connector 76 of the UPS 10 provide mechanical and electrical connection between the battery and the operational components of the UPS 10.

In another embodiment illustrated in FIGS. 8 and 9, the battery 18 includes two terminal connectors, together indicated at 78, that are mechanically and electrically connected to two cables, together indicated at 80, of the UPS. The cables 80 must be disconnected from the battery terminal connectors 78 prior to removing the battery 18 from the housing 60. In one embodiment, the battery terminal connectors 78 include a red connector and a black connector that connect to a red cable and a black cable of the UPS 10, respectively.

In an embodiment discussed in greater detail below, prior to removing the battery 18, the UPS 10 should be shut down by disconnecting the battery connector 68, if utilized, and the input 24 (receptacle 64) and the output 26 (receptacles 66) should be disconnected from power cords connecting the UPS to a power supply and any equipment, respectively. In another embodiment where the battery 18 is hot swappable, the UPS 10 remains connected and active while the battery 18 is removed and replaced.

Referring back to FIG. 1, the controller 16 is coupled to the input 24 of the UPS 10 by the breaker/filter 12 and the rectifier 14, which form part of the power supply circuit. Thus, the controller 16 may receive information about the power provided to the UPS 10, including amps, voltage, termination of power, etc. As will be discussed in greater detail below, the controller 16 is configured to retrieve at least one stored procedure corresponding to replacing the battery 18 under certain conditions. In certain embodiments, the stored procedure may include a plurality of program steps that are performed by the operator or user of the UPS 10.

Still referring to FIG. 1, one or more sensors 82 are coupled to the battery 18 to provide information regarding the status of the battery. The sensor 82 may be referred to herein broadly as "devices." In one embodiment, the sensor 82 may be any connection to the battery 18 that measures parameters of the battery or otherwise provides information about the battery to the controller 16. Thus, the sensor 82 may simply be devices used to measure voltage or capacity of the battery 18, or in other embodiments, may be a charging device used to charge the battery when the battery is not used or is low in power. The controller 16 and the sensor 82 are coupled such that the controller receives at least a portion of status information of the battery 18 from the sensor. For example, as described above, the sensor 80 may be configured to detect information about the battery 18 (e.g., the voltage or capacity of the battery) when the battery is connected. When the battery 18 is not connected, this information would not be received by the controller 16 thereby indicating that the battery is removed from the housing or not otherwise properly connected. In other embodiments, the sensor 82 may be configured to detect when the battery 18 is removed from the housing 60, when the battery cover 70 is open, when the new battery is not properly installed, etc. For example, a mechanical sensor may be provided to detect the presence of the battery.

The arrangement is such that the user interface 30, which is disposed in the front cover 62 of the UPS 10 as illustrated in FIG. 3, displays the plurality of program steps of the stored procedure. Thus, based on information provided by the sensor 82, the controller 16 is configured to prompt the user via the user interface 30 to perform any number of steps, including notifying the user of a disconnected battery, instructing the user to remove the battery, instructing the user to install or otherwise connect a new battery, and instructing the user to reset battery performance indicators.

Referring to FIGS. 10-15, various steps of a replace battery routine are depicted on the interface display of the user interface 30. Although a replace battery routine is described herein, it should be understood that this routine may refer to any procedure initiated by the controller or by a user to replace an old battery with a new battery or otherwise install a new battery within the UPS. In one embodiment, for example, the replace battery routine may be initiated by the illumination of the replace battery indicator 42.

Alternatively, or in addition to the illumination of the replace battery indicator 42, the user interface 30, which may be provided on the front cover 62 of the UPS 10 illustrated in FIG. 3 as discussed above, may provide the user instructions from a procedure stored within the controller 16. The interface display 50 may be configured to prompt the user to initiate a battery installment routine in response to detecting the absence of the battery, for example. In one embodiment, when connectors of the battery (e.g., connectors 74, 76 shown in FIG. 7 and connectors 78, 80 shown in FIG. 8) are disconnected, the controller 16, upon detecting the absence of the battery, may initiate a battery installment routine. Should the user not want to begin the battery installment routine, the user may press the escape button 58. However, should the user want to initiate the battery installment routine, the user may press the enter button 56.

In one embodiment, the user may be prompted to disconnect the battery 18. The user disconnects the battery 18 in the manner described above, or in any other suitable manner depending on the type of UPS employed. By virtue of the cable connectors 74, 76 or the terminal connectors 78 and cables 80 being disconnected, the controller 16 "senses" the disconnection of the battery 18 from the UPS 10. As discussed above, other devices may be used to sense the disconnection of the battery 18. When the battery 18 is disconnected, and the sensor 82 detects its disconnection, the interface display 50 illustrated in FIG. 10 reads "Battery Disconnected."

Figure 11:
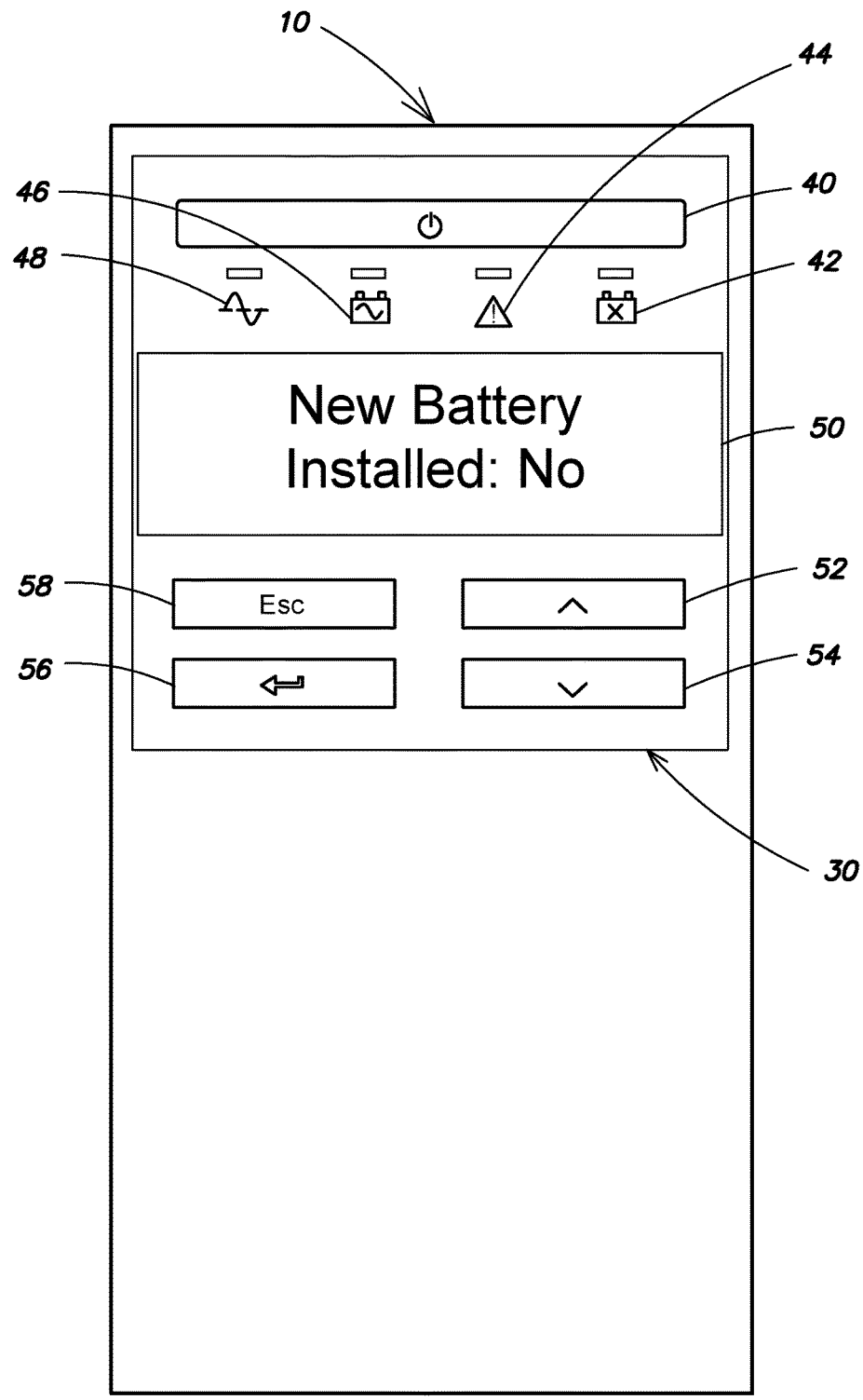

As shown in FIG. 11, the interface display 50 next prompts the user to install a new battery 18 by notifying the user "New Battery Installed: No." The user installs the battery 18 by positioning the battery 18 within the housing 60 of the UPS 10 and connecting the cable connectors 74, 76 of the battery and the UPS for the embodiment shown in FIGS. 6 and 7 or by connecting the cables 80 of the UPS to the terminal connectors 78 of the battery for the embodiment shown in FIGS. 8 and 9. Once connected, the controller 16 "senses" the connection of the battery 18 since information from the battery is being provided to the controller.

Figure 12:
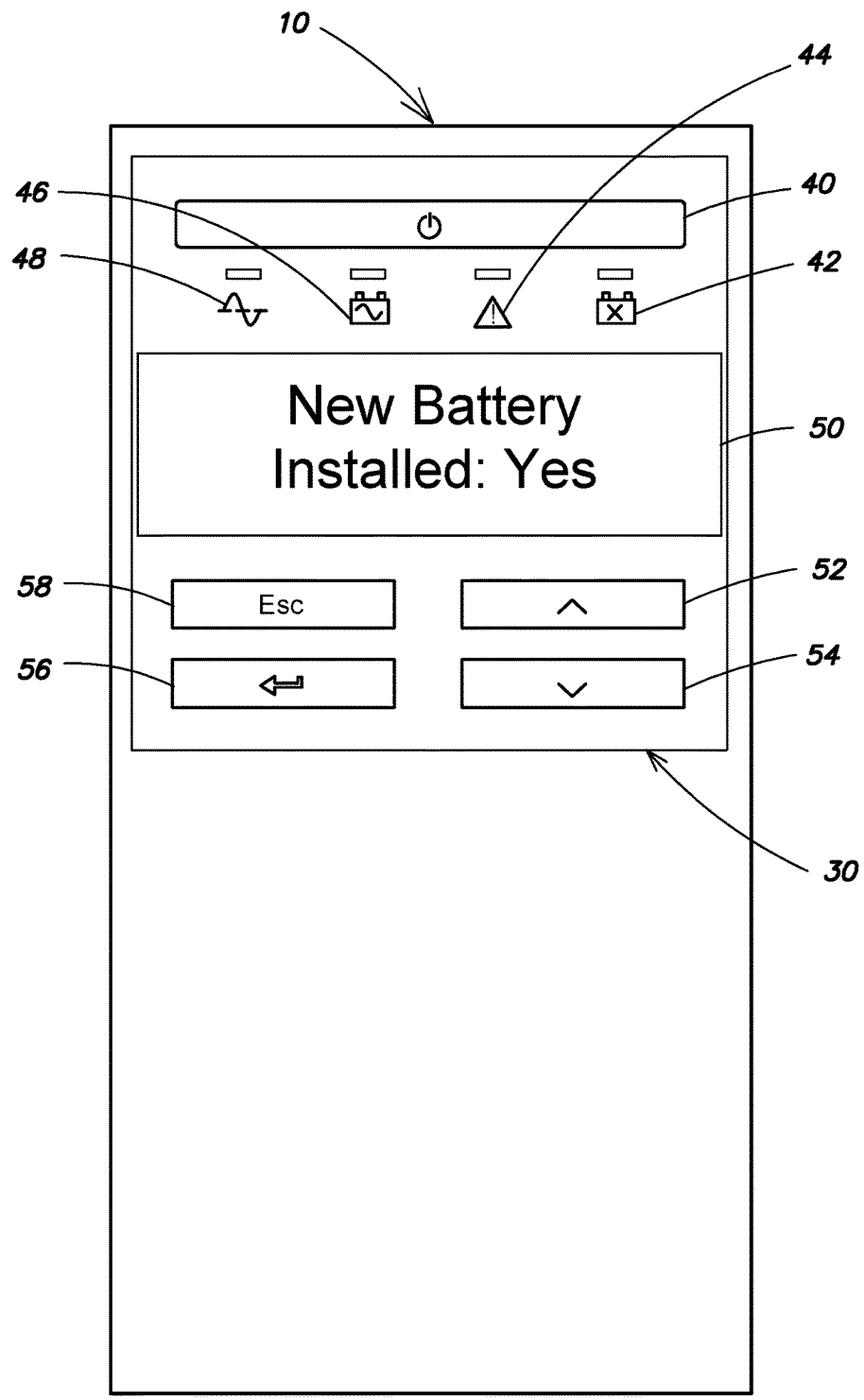

Next, as shown in FIG. 12, the interface display 50 prompts the user to confirm that a new battery 18 was installed by indicating "New Battery Installed: Yes." In one embodiment, this screen may be prompted upon the controller 16 receiving information about the battery 18. The user presses the enter button 56 to inform the controller that installation is completed.

Figure 13:
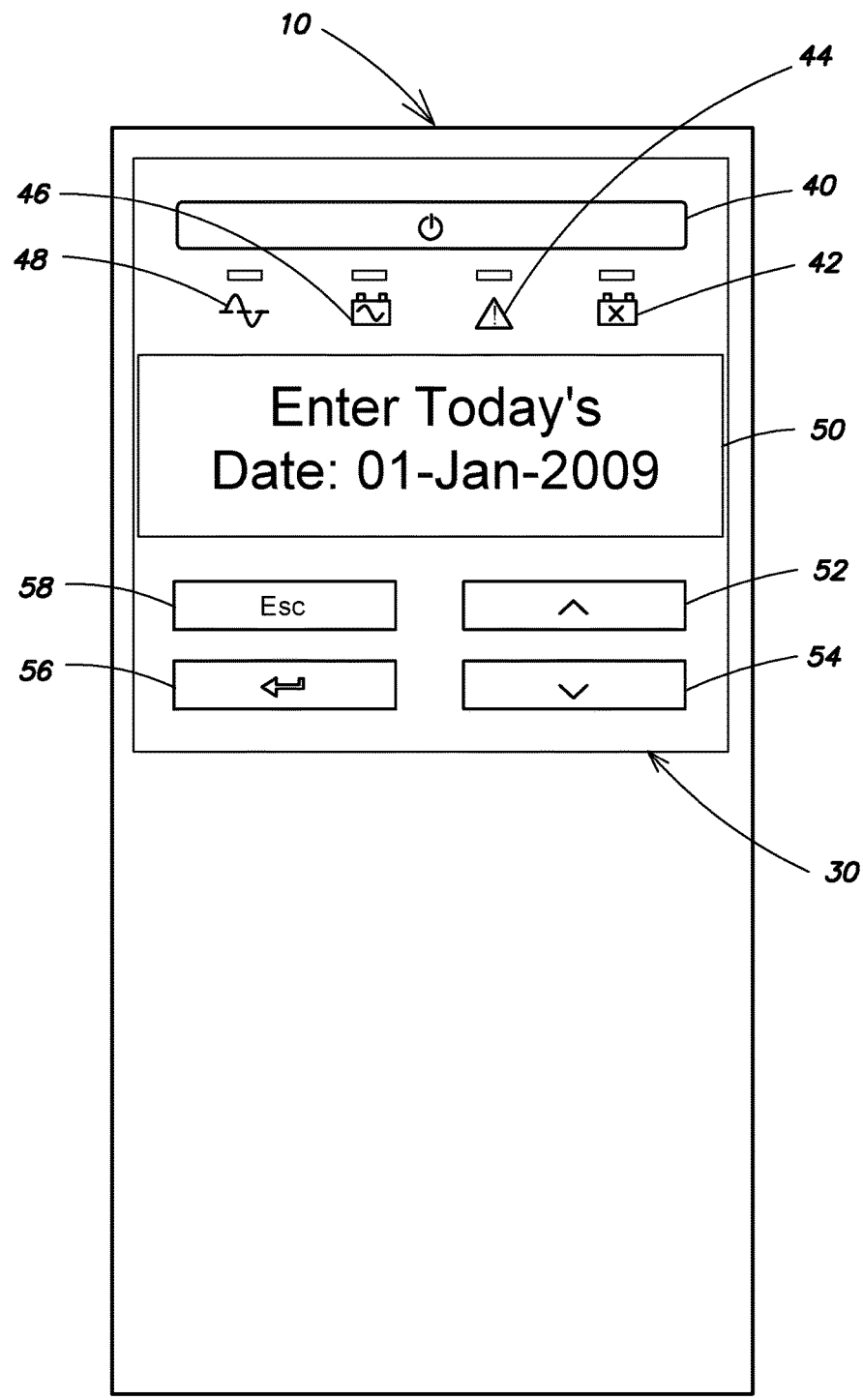

Once the user indicates that the battery 18 has been installed, the interface display 50 prompts the user to reset the battery performance indicators. Such battery performance indicators may include on or more of the following: calibrating battery constant values; updating the new battery replacement date and/or prompting the user to input the installation date of the battery; verifying battery runtime accuracy; and conducting a discharge/recharge routine. For example, the interface display 50 prompts the user to confirm the date by displaying "Enter Today's Date: [DATE]," which is shown in FIG. 13. The user can press the enter button 56 to confirm the date. In other embodiments, the user may use the scroll up button 52 and the scroll down button 54 to input the date of installation of the battery 18. Once the battery performance indicators are reset, the user interface 50 may be configured to notify the user that the replace battery routine is complete.

Each battery performance indicator may be prompted on the interface display 50. For example, one or more of the following may be displayed on the interface display 50: "Is This A New Battery? Yes/No;" "Enter Date: Mo/Year;" "Initiate Runtime Calibration: Yes/No;" and/or "Perform Battery Discharge/Recharge: Yes/No." For most batteries (e.g., batteries not having their own microprocessor), this information is required to be entered by the user since the battery is incapable of reporting battery indicators to the controller. Other information, such as the brand name and type of battery installed may also be requested. Thus, the user is able to enter this information directly through the interface display 50 of the user interface 30 of the UPS 10. Also, by performing a battery discharge/recharge routine, the controller 16 of the UPS 10 may be configured to calculate some of the performance indicators about the battery, such as the capacity of the battery and/or the power data of the battery. By discharging and recharging the battery 18, the performance indicators of that particular battery may be determined without assuming a nominal battery performance.

Figure 14:
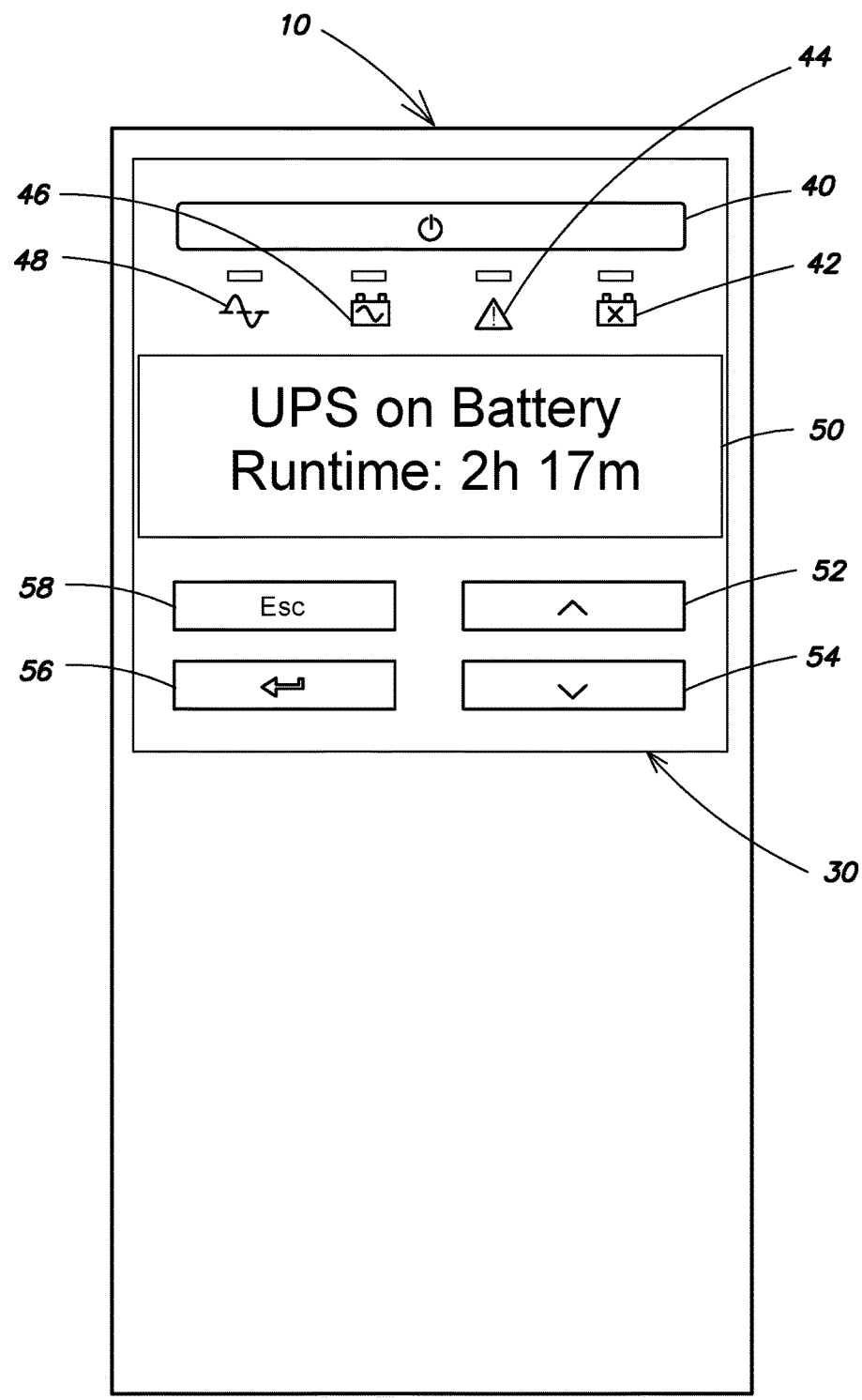

In certain embodiments, the controller 16 is further configured to notify the user via the user interface 50 of when the battery 18 will shut down. This may be referred to as a runtime routine, which may be a procedure stored in the in the data storage 32 or the controller 16. During operation of the UPS 10 under the power of the battery 18, the on-battery power indicator 46 is illuminated. FIG. 14 illustrates the user interface 50 displaying an exemplary battery life expectancy—"UPS On Battery Runtime: 2 h 17 m." In addition to the illumination of the on-battery power indicator 46, this message may be displayed when the battery 18 is employed.

Figure 15:
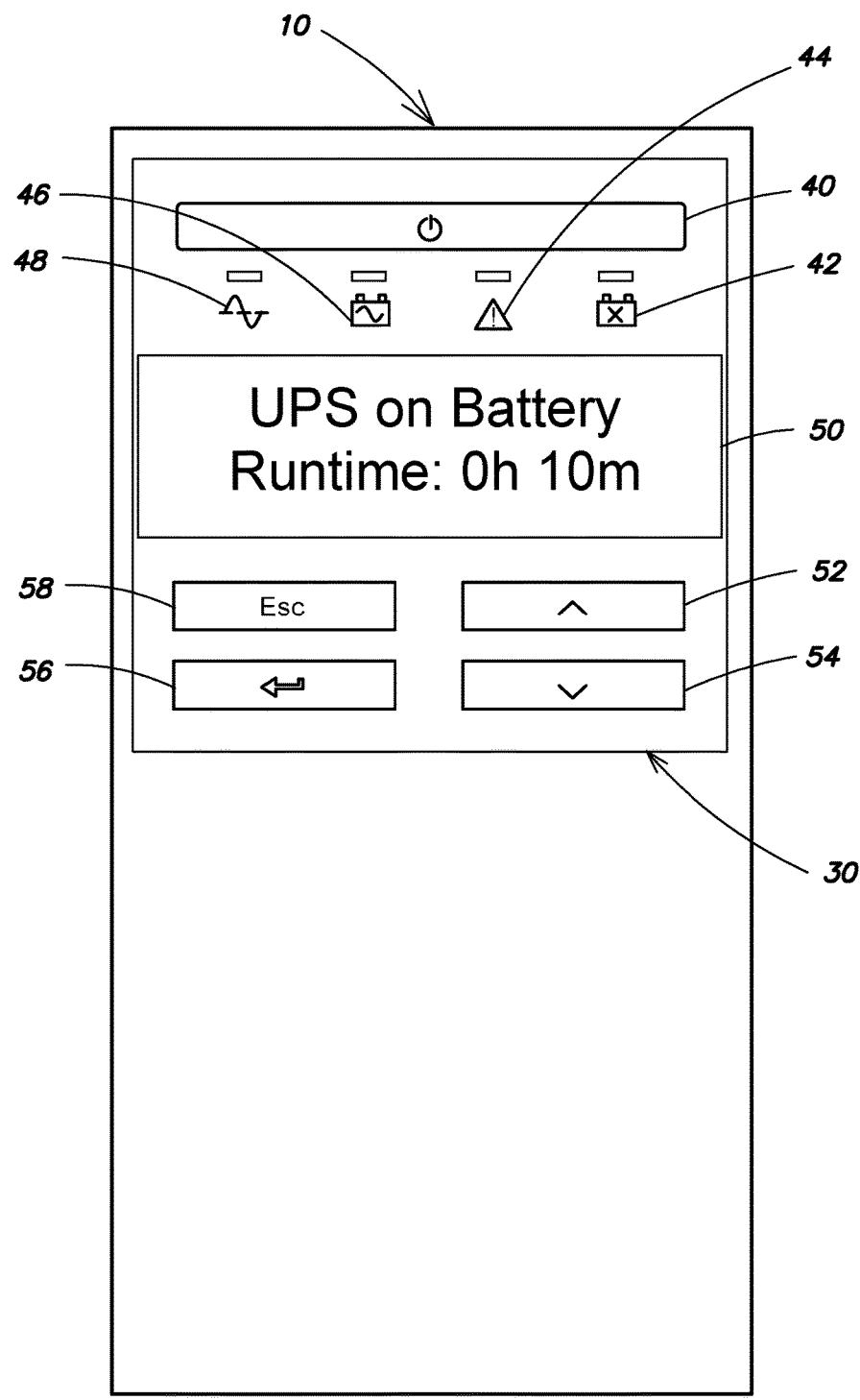

During the runtime routine, the user interface 50 notifies the user of the life-expectancy of the battery 18. For example, FIG. 15 illustrates interface display 50 reading "UPS On Battery Runtime: 0h 10 min." The runtime routine may be programmed so that the interface display 50 notifies the user periodically of the battery runtime, e.g., ten-minute intervals. In other configurations, the runtime routine may be programmed to display the actual life expectancy of the battery continuously.

Figure 16:
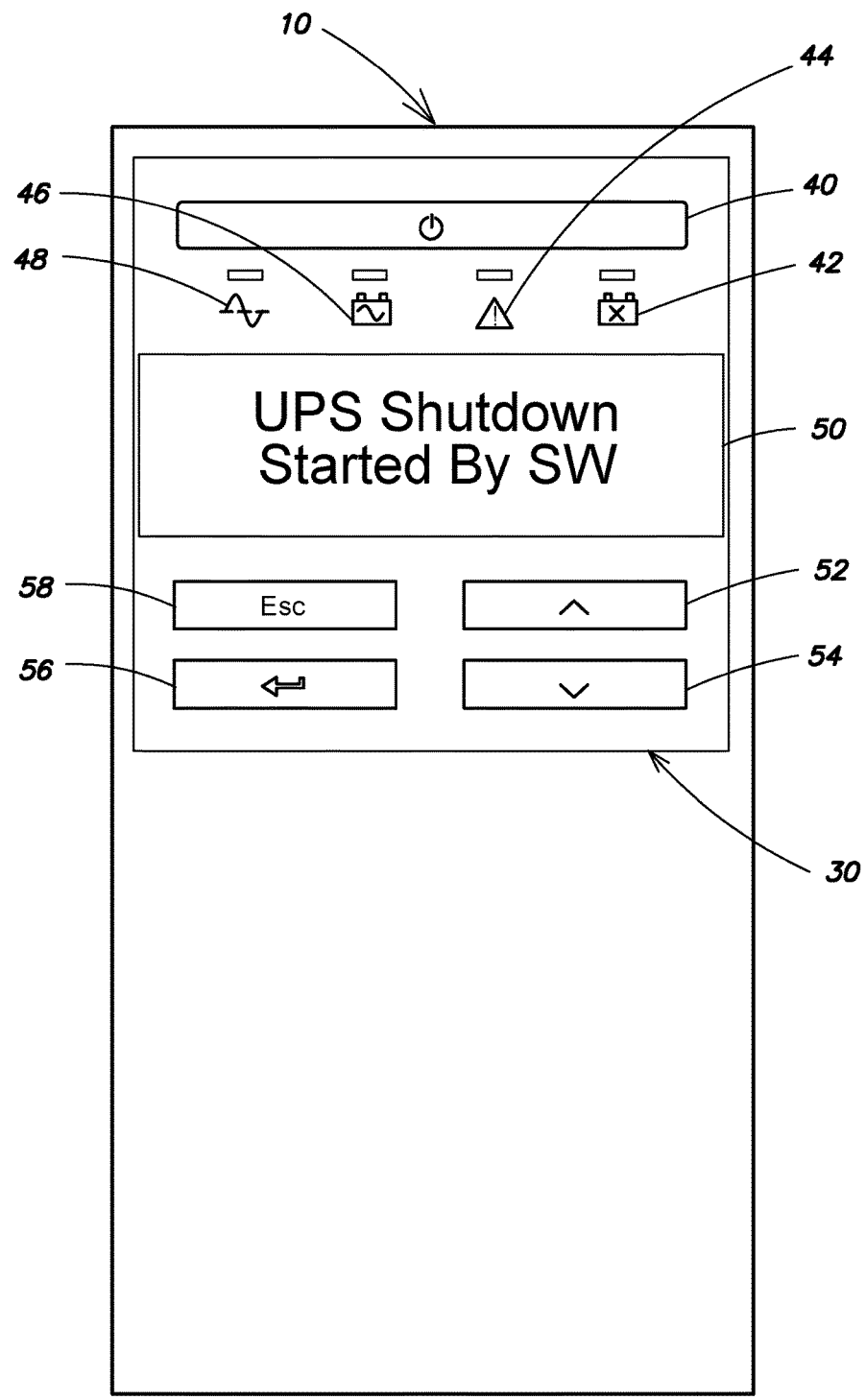
Figure 17:
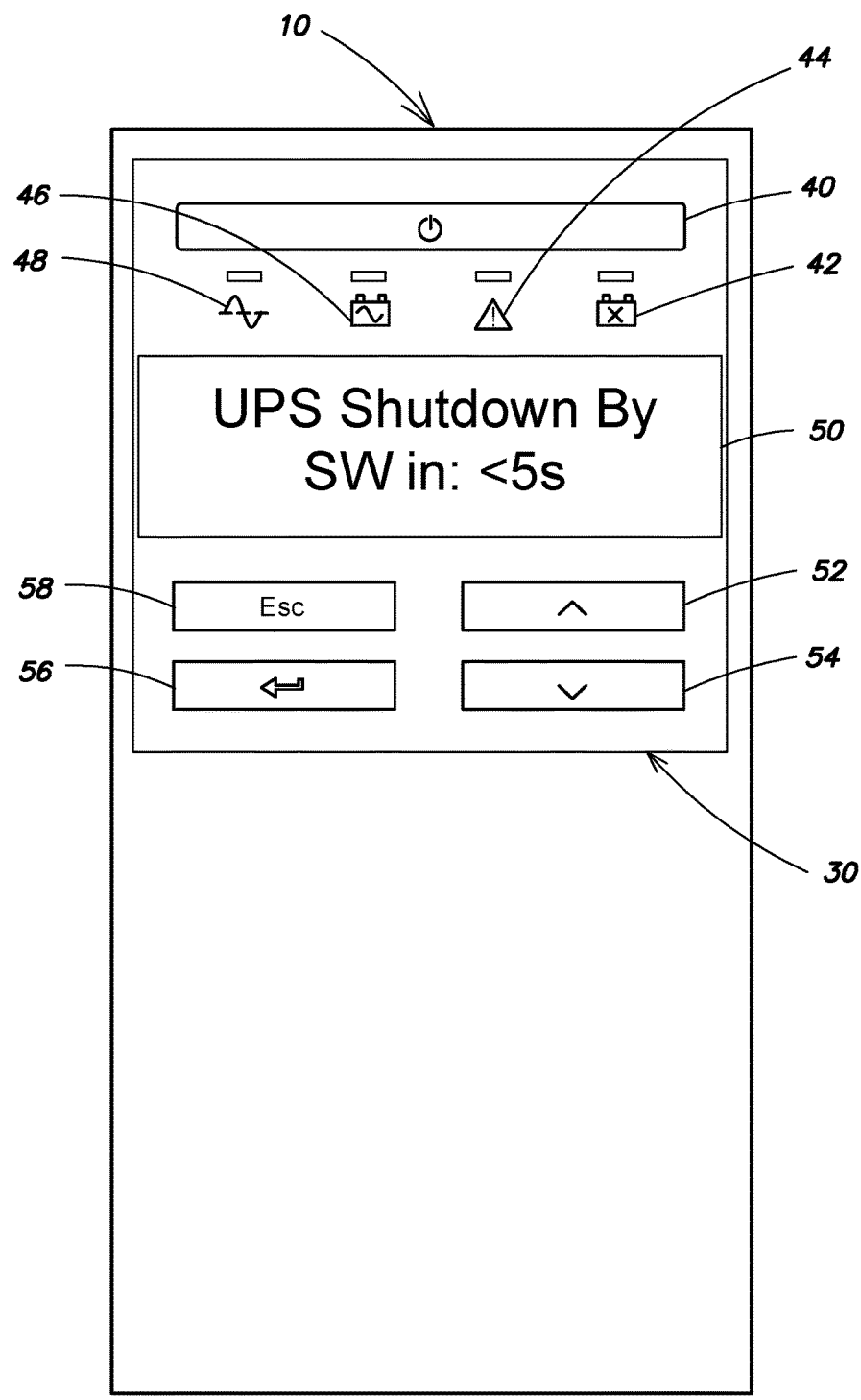
Figure 18:
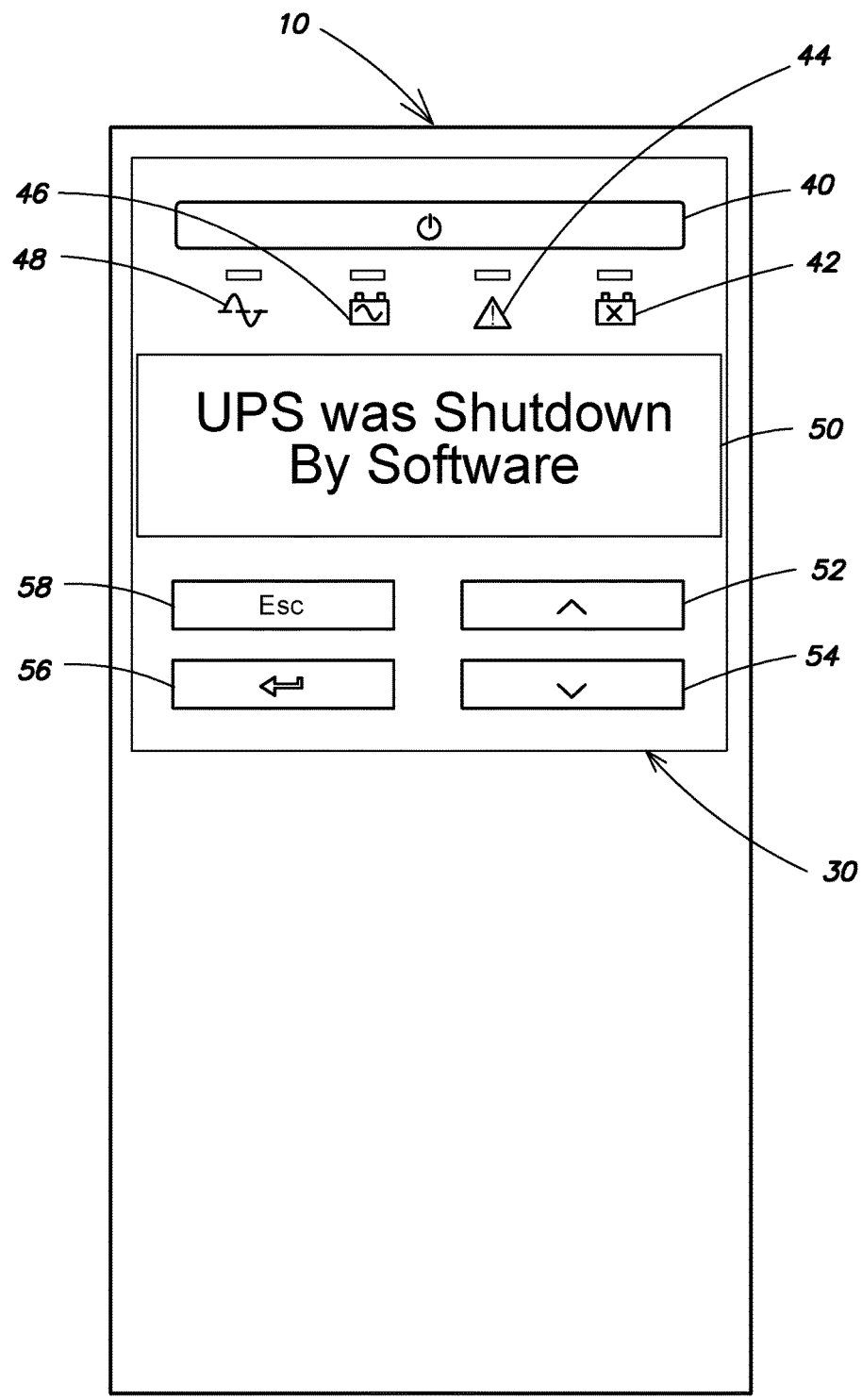

Once the battery life expectancy is below a certain threshold, e.g. one minute, the controller 16 may be configured to notify the user via the user interface 50 that the UPS 10 will be shutting down. This may be referred to as a shut down routine, which may be a procedure stored in the data storage 32 or the controller 16. Referring to FIG. 16, the interface display 50 reads "UPS Shutdown Started by SW." SW indicates "software." This notifies the user that the UPS shutdown has begun. The shutdown routine may be further programmed so that a countdown to the shutdown may be displayed on the interface display 50. This is illustrated in FIG. 17, which reads "UPS Shutdown By SW in: <5 s." Once the UPS is shutdown, the interface display 50 may read "UPS was Shutdown By Software," which is illustrated in FIG. 18.

Figure 19:
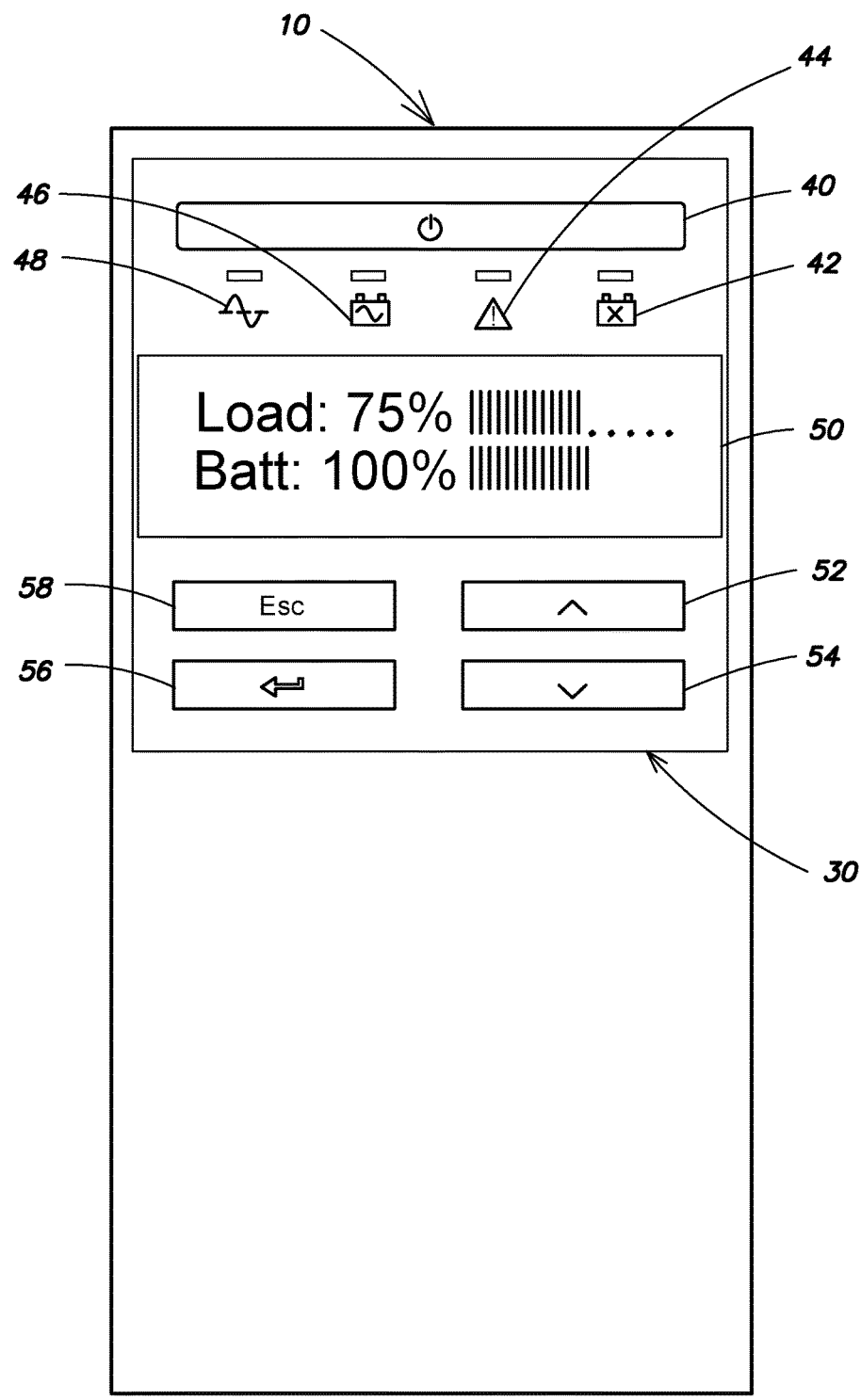

In other embodiments, the interface display 50 may be configured to display a load on the UPS 10 and a percentage of full battery life expectancy. Turning to FIG. 19, an exemplary interface display 50 illustrates a load or power of 75% and a percentage of full battery life expectancy of 100%. The interface display 50 may be configured to display other parameters, such as power input and output conditions.

In further embodiments, a method of guiding a user through a procedure corresponding to replacing a battery 18 of a UPS 10 is further disclosed. The method may be employed on the UPS described herein. In one embodiment, the method comprises: (a) determining whether the battery 18 within the UPS 10 is disconnected from the UPS; (b) initiating a battery installment routine if the battery within the UPS is disconnected; and (c) displaying steps (a) and (b) on a user interface provided on a housing of the UPS. In one example, the user interface may be the user interface 30 having the interface display 50 described herein. In determining whether the battery 18 is disconnected or otherwise requires replacement, the replace battery indicator 42 may be illuminated. Instead of or in addition to illuminating the replace battery indicator 42, the interface display 50 may notify the user to that the battery is disconnected by displaying "Battery Disconnected" as described above with reference to FIG. 10.

The step of initiating the battery installment routine may include one or more of the following steps: removing the battery 18; indicating whether the battery has been removed; installing a new battery; determining whether a new battery has been properly installed; and resetting battery performance indicators. When removing an old battery 18 and installing a new battery, the removal and installation of the battery may be performed in the manner described above with reference to FIGS. 3-9 depending on the type and/or model of the battery. When resetting battery performance indicators, one or more of the indicators described above may be reset.

When determining whether a new battery 18 has been properly installed, information about the status of the battery of the UPS 10 may be obtained from the sensor 82 embedded within or connected to the UPS. The user may be notified by the interface display 50 by the message "New Battery Installed: No," which is shown in FIG. 11. Once installed properly, the interface display 50 may read "New Battery Installed: Yes," which is shown in FIG. 12.

The step of resetting battery performance indicators may include one or more of the following: verifying battery runtime accuracy, calibrating battery constant values, updating the new battery replacement date, and/or discharging/recharging battery. For example, as described above with reference to FIG. 13, the user may be prompted to accept or insert a new battery replacement date.

Although the systems and methods disclosed herein are described when referencing an uninterruptible power supply, it should be understood that the applications disclosed herein are applicable to other types of power devices, such as outlet strips, power converters, line conditioners, surge protectors, power conditioners, Power Distribution Units (PDU) and Rack PDUs and the like. The systems and methods for installing or otherwise replacing a battery may be used in such devices according to the teachings provided herein.

Having thus described several aspects of at least one embodiment of this disclosure, it is to be appreciated various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

What is claimed is:

1. A system for guiding a user through a procedure corresponding to installing a battery in an uninterruptible power supply that is associated with the system, the system comprising:

at least one programmed processor embedded within the uninterruptible power supply, the programmed processor being configured to determine whether the battery is disconnected from the uninterruptible power supply, and in response to determining the battery is disconnected, retrieve at least one stored procedure corresponding to a battery installment routine for installing the battery in the uninterruptible power supply, the stored procedure including a plurality of steps arranged in a predetermined order to be performed by the user;

at least one device embedded within the uninterruptible power supply, the device providing information regarding a status indicator of the battery of the uninterruptible power supply, the programmed processor and the device being operatively coupled such that the programmed processor receives at least a portion of the information of the battery from the device; and a display screen including an alphanumeric display forming part of the uninterruptible power supply, and including at least one function button, the display screen being coupled to the programmed processor for displaying the plurality of steps of the stored procedure, wherein in response to receiving user acceptance of the battery installment routine the display screen forming part of the uninterruptible power supply is configured to depict individual steps of the plurality of steps in the predetermined order and the programmed processor is configured to guide the user via the display screen through the individual steps of the plurality of steps of the stored procedure in the predetermined order to install a battery and to receive confirmation from the user that an individual step has been completed based on activation of the function button by the user, and determine whether the user followed the stored procedure to install the battery, and wherein the stored procedure is further configured to prompt for input from the user subsequent to installation of the battery, and the programmed processor is configured to wait for the input prior to resetting at least one battery performance indicator.

2. The system of claim 1, wherein the step of resetting the battery performance indicator includes verifying battery runtime accuracy.

3. The system of claim 1, wherein the step of resetting the battery performance indicator includes calibrating battery constant values.

4. The system of claim 1, wherein the step of resetting the battery performance indicator includes updating the battery installation date.

5. The system of claim 1, wherein the programmed processor is further configured to notify the user via the display screen of when the battery will shut down.

6. The system of claim 1, wherein the programmed processor, when prompting the user to install the battery, notifies the user of a battery disconnection.

7. The system of claim 1, wherein the programmed processor, when prompting the user to install the battery, notifies the user of proper installation of the battery.

8. The system of claim 1, wherein the programmed processor, when prompting the user to reset the battery performance indicator, prompts the user to input or otherwise verify the installation date of the battery.

9. An uninterruptible power supply comprising:
a housing;
an input, supported by the housing, to receive input power;
a power supply circuit, supported by the housing and coupled to the input, to convert input power received from the input;
an output, supported by the housing and coupled to the power supply circuit, to provide output power derived from the power supply circuit;
a battery, supported by the housing and coupled to the power supply circuit, to provide battery power to the power supply circuit when input power to the input is compromised;
a controller, supported by the housing and coupled to the power supply circuit, the controller being configured to determine whether the battery is disconnected from the UPS, and in response to determining the battery is disconnected retrieve at least one stored procedure corresponding to a battery installment routine for installing the battery, the stored procedure including a plurality of steps arranged in a predetermined order to be performed by the user;
at least one device, supported by the housing, to provide information regarding the status of the battery of the uninterruptible power supply, the controller and the device being coupled such that the controller receives at least a portion of the information from the device; and
a display screen including an alphanumeric display, and including at least one function button, supported by the housing and coupled to the controller, to display the steps,
wherein in response to receiving user acceptance of the battery installment routine the display screen is configured to depict individual steps of the plurality of steps in the predetermined order and the controller is further configured to guide the user via the display screen through the individual steps of the plurality of steps of the stored procedure in the predetermined order to install the battery and to receive confirmation from the user that an individual step has been completed based on activation of the function button by the user, and determine whether the user followed the stored procedure to install the battery, wherein the stored procedure is configured to prompt for input from the user subsequent to installation of the battery, and wherein the controller is further configured to wait for the input prior to resetting at least one battery performance indicator.

10. The system of claim 9, wherein the step of resetting the battery performance indicator includes calibrating battery constant values.

11. The system of claim 9, wherein the step of resetting the battery performance indicator includes updating the battery installation date.

12. The system of claim 9, wherein the controller prompts the user to input or otherwise confirm the installation date of the battery.

13. The system of claim 9, wherein the controller is further configured to notify the user via the display screen of when the battery will shut down.

14. The system of claim 9, wherein the controller, when prompting the user to install the battery, notifies the user of a battery disconnection.

15. The system of claim 9, wherein the controller, when prompting the user to install the battery, prompts the user to input or otherwise confirm the installation date of the battery.

16. A method of guiding a user through a procedure corresponding to installing a new battery of an uninterruptible power supply, the method comprising:
(a) determining whether the new battery within the uninterruptible power supply is connected to the uninterruptible power supply;
(b) initiating a battery installment routine if the battery within the uninterruptible power supply requires installment, the battery installment routine including, arranged in a predetermined order,
receiving acceptance of the battery installment routine from a user,
providing instructions to the user to remove a first battery,
indicating that the first battery has been removed,
providing instructions to a user to install the new battery,
prompting for confirmation from the user that the new battery has been installed based on activation of a function button by the user;
determining whether the user followed the instructions to the user to remove the first battery and the instructions to the user to install the new battery,
determining whether the new battery has been properly installed,
prompting for input from a user subsequent to determining whether the new battery has been properly installed, and
resetting at least one battery performance indicator based on the input; and
(c) displaying steps (a) and (b) on an alphanumeric display included within a display screen provided on a housing of the uninterruptible power to guide the user through the installment routine in the predetermined order.

17. The method of claim 16, wherein determining whether the new battery has been properly installed is determined by obtaining information of the status of the new battery of the uninterruptible power supply from at least one device embedded within the uninterruptible power supply.

18. The method of claim 16, wherein resetting the new battery performance indicator includes verifying battery runtime accuracy.

19. The method of claim 16, wherein resetting the new battery performance indicator includes calibrating battery constant values.

20. The method of claim 16, wherein resetting the new battery performance indicator includes updating the new battery installation date.

\* \* \* \* \*